Sept. 15, 1953     M. H. COLE     2,652,045
ENGINE CRANKING DEVICE
Filed May 20, 1952

INVENTOR
Mark H. Cole
BY *Fisher*
ATTORNEY

Patented Sept. 15, 1953

2,652,045

UNITED STATES PATENT OFFICE 2,652,045

ENGINE CRANKING DEVICE

Mark H. Cole, Downers Grove, Ill., assignor to The Safety Crank Company, a corporation of Illinois Application May 20, 1952, Serial No. 288,865

1 Claim. (Cl. 123—185)

This invention pertains to hand-cranking devices for internal-combustion engines of small sizes such as may be cranked by hand.

An object of this invention is to provide such a cranking device of simple construction having locking means against reverse rotation having minimum backlash under backfire by the engine, thereby providing maximum protection to the operator.

Generally stated, the invention comprises a cranking shaft member manipulatable by the operator and releasably connectable to the engine shaft. A drum member on said shaft member is constantly engaged by a plurality of locking rollers each eccentrically mounted on a stationary axle and yieldingly maintained in contact with the drum. Reverse rotation of the drum due to backfire moves each roller into locking relation between the drum and the axle.

Figure 1:
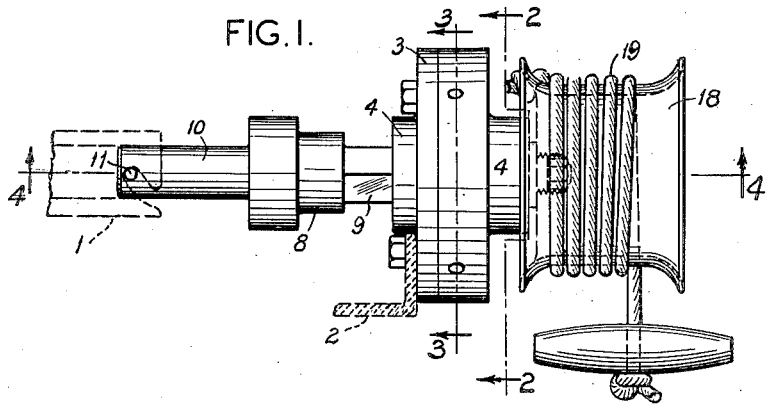
Figure 2:
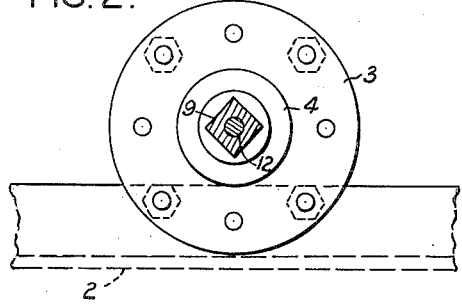
Figure 3:
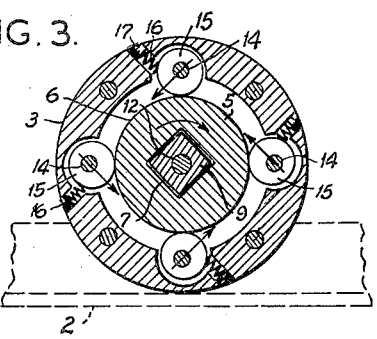
Figure 4:
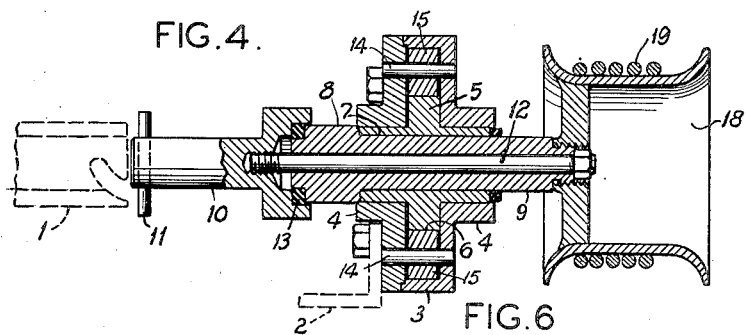
Figure 5:
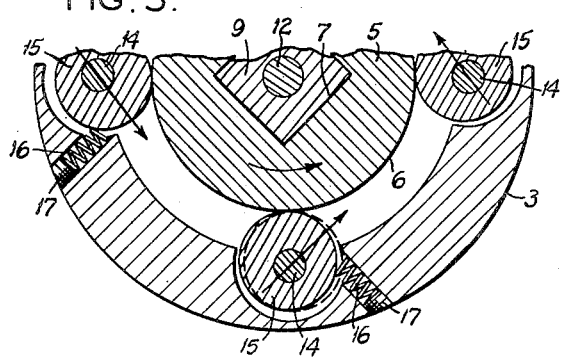
Figure 6:
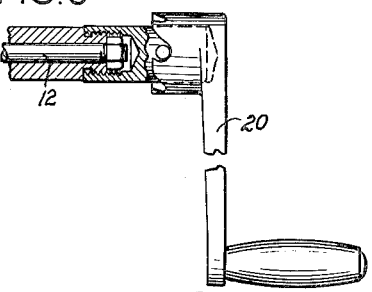

A preferred embodiment of this invention is illustrated in the accompanying drawing, in which Figure 1 is a side elevation of a cranking device embodying this invention, Figure 2 is a section on line 2—2 of Fig. 1, Figure 3 is a section on line 3—3 of Fig. 1, Figure 4 is a section on line 4—4 of Fig. 1, Figure 5 is an enlarged section similar to Fig. 3, and Figure 6 is a modified detail of Fig. 4 showing an alternative manipulating element.

In the several views of the drawing, 1 designates the usual coupling on the shaft of the engine to be started, and 2 designates any available member of the engine supporting frame or other stationary structure to which the device may be anchored.

Mounted on the frame 2 is a stationary housing 3 having bearing portions 4 in which is journaled for rotation a member 5. This member is generally disc-shaped and has a cylindrical peripheral surface 6 providing, in effect, a brake drum. The member 5 is formed with an axial passage 7, of square cross-section, extending therethrough. A cranking shaft member 8 has a square shank 9 slidably fitted in the passage 7, so that it may slide lengthwise therein, but is keyed by its square shape for rotation with the drum member 5.

A coupling member 10, releasably connectable with the coupling 1, as by a pin 11, is secured to the shaft member 8 by a bolt 12 traversing an axial bore in said member. A resilient collar 13 of rubber or the like may be interposed between the members 8 and 10 as shown in Fig. 4 to provide a slightly flexible connection therebetween to allow for misalignment with the coupling 1, and to cushion the shock of ejecting the pin 11 from the coupling 1 when the engine starts.

Mounted in the housing 3 is a plurality of axle pins 14 arranged around the outside of the drum 5. Mounted for rotation on each of said pins 14 is an eccentric locking roller 15. These rollers are slightly eccentric with respect to their axle pins and their eccentricity is so oriented that their true centers are offset from the centers of their axles in the direction of forward rotation as indicated by the arrows through said centers in Figures 3 and 5, forward rotation being the normal direction of rotation of the engine, shown by the curved arrow in Fig. 5. The rollers 15 are maintained in contact with the drum surface 6 by springs 16 housed in slant holes in the housing 3, as shown in Figures 3 and 5, and retained by set screws 17.

Any suitable manipulating means for cranking the shaft member 8 may be provided, such as a drum 18 and starting cord 19, or an ordinary crank handle 20 as shown in Fig. 6.

In operation, the cord 19 having been properly wound, the shaft member 8 is slid to the left, Fig. 1, to engage the pin 11 with the coupling 1 in the usual manner, after which a proper pull on the cord 19 will rotate the engine shaft to start the engine. If the engine starts its normal rotation in the direction of the curved arrow in Fig. 5, the rollers 15 simply slide on the surface of the drum 5 without retardation thereof. If the engine backfires, however, its reverse rotation, in the direction of the curved arrow in Fig. 3, will cause the rollers to jam between the drum 5 and their respective axles, thereby checking such rotation. Subsequent cranking in the forward direction will again free the rollers for normal operation.

I claim:

A device for cranking engines, comprising, a stationary housing, a drum member journaled for rotation in said housing and having a cylindrical peripheral surface and an axial passage therethrough, a shaft member having a shank slidably fitted in said passage but keyed therein to rotate with said drum member, said shaft member having an axial bore extending therethrough, a plurality of locking rollers in said housing engaging said peripheral surface of said drum member adapted to permit forward rotation of said drum member but to lock the same against reverse rotation, a coupling member releasably connectable to the engine shaft, a bolt traversing said bore to connect said coupling member to said shaft member, and a resilient collar interposed between said coupling and shaft members.

MARK H. COLE.

References Cited in the file of this patent

UNITED STATES PATENTS

| Number | Name | Date |
|---|---|---|
| 1,148,176 | Liberty | Juply 27, 1915 |
| 1,196,379 | Miller | Aug. 29, 1916 |
| 2,023,961 | Leichsenring, Jr. | Dec. 10, 1935 |
| 2,181,700 | Leichsenring, Jr. | Nov. 28, 1939 |